April 23, 1963 S. W. SCHOELLHORN ET AL 3,087,120
AUTOMATIC VOLUME CONTROL CIRCUIT
Filed Oct. 20, 1959
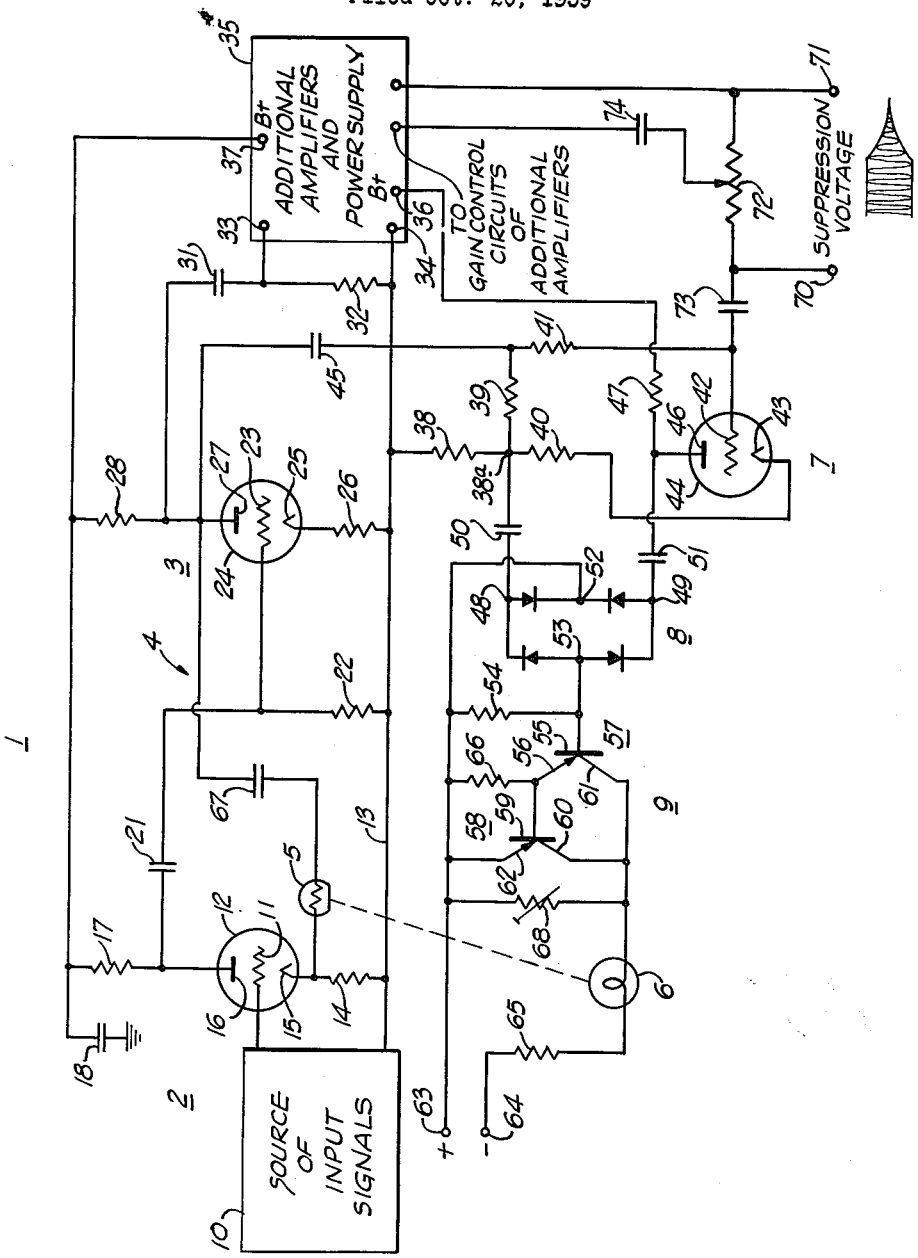
INVENTORS
SIDNEY W. SCHOELLHORN AND
FREDERICK A. ROBERTS
by
Mason, Kolehmainen, Rathburn and Wyss.
ATTORNEYS.

United States Patent Office 3,087,120
Patented Apr. 23, 1963

3,087,120
AUTOMATIC VOLUME CONTROL CIRCUIT
Sidney W. Schoellhorn, Tulsa, Okla., and Frederick Alexander Roberts, Champaign, Ill., assignors to Seismograph Service Corporation, Tulsa, Okla., a corporation of Delaware
Filed Oct. 20, 1959, Ser. No. 847,486
8 Claims. (Cl. 330—59)

The present invention relates to automatic volume control circuits and it more particularly relates to automatic volume control circuits which are suitable for use with balanced amplifier circuits, such as those commonly used in seismic amplifiers.

In seismic prospecting, elastic waves are generated in the earth preferably by detonating one or more explosive charges. The seismic waves thus generated travel through the subsurface formations by way of refraction and by reflection from the subsurface interfaces and are detected by a plurality of geophones spaced from the shot or detonating point where the detected waves are converted into electrical signals which are amplified and then recorded. From the records thus obtained, information may be obtained as to the character of the subsurface formations.

In so-called reflection shooting, the waves as received at the signal detectors include an initial tremor, the first break of which is often quite weak. Following the first break, a very strong series of waves appear which soon gives way to a series of overlapped and detained wave trains of progressively lower average amplitudes. Thus, a typical seismic signal wave pattern includes waves of very high amplitude and waves of very small amplitude, and the amplitude ranges of these signals are far too great to permit recording of all of the waves at their relative amplitudes as normally encountered in practice.

In practice, two types of gain control systems have been employed in seismic signal amplifiers to obviate the problem outlined above. One of these systems is commonly referred to as a time control system, the name being derived from the fact that in such a system the gain of the seismic amplifier is arbitrarily varied as a function of time and independent of signal amplitude. This type of system is open to the objection that the amplitude pattern of the output signals from a seismic amplifier is not constant in normal seismic recordings. Hence, the amplitude pattern of the seismic energy applied to the input side of the amplifier does not usually conform with sufficient accuracy to the time-gain change pattern of the gain control system. The second type of gain control system commonly in use is the so-called automatic volume control system, hereinafter abbreviated as an AVC system, in which the amplitude of the seismic signals appearing at the output side of the amplifier is controlled by feeding a portion of the output energy into a control network which varies the gain of the amplifier inversely in accordance with the amplitude of the signal input to the amplifier. In general, this type of system tends to hold the seismic amplifier output signal level at a relatively constant value, but conventional AVC systems are not ordinarily suitable for use in seismic amplifiers. AVC circuits of prior design have usually worked either upon the principle of controlling the grid of a vacuum tube in accordance with signal amplitude, i.e., the grid bias is increased for high amplitude signals to decrease the gain; or of using a variable impedance network to bypass the signal, with the impedance being controlled by the amplitude of the signal, i.e., the impedance of the bypass network is low for high amplitude signals thus bypassing a large amount of the signal. For example, one type of variable impedance network used heretofore includes a bridge circuit employing diodes in two of the bridge arms with the diodes being back biased to provide very high impedance and, hence, very little attenuation to low amplitude signals. High amplitude signals, however, overcome the back bias so that the diodes become low impedances with the result that the high amplitude signals are attenuated. This operation requires that the diodes and the associated circuits be exactly matched over the entire range of operation, a condition which is impossible to achieve. More specifically, if the bridge becomes unbalanced, as for example, might be caused by unbalances in the diodes at the different operating levels, signals are supplied to the amplifier. Since the AVC control is preferably provided at the front end of the seismic amplifier it is followed by as much as 100 db of gain in the amplifier. Therefore, any undesired bridge unbalances are passed through the high gain amplifying stages and are recorded on the final record. Tolerable bridge unbalance must be no greater than the tube noise at the front end of the amplifier if it is to be indistinguishable from random noise present. Conventional bridge type AVC control circuits of the type described above have the disadvantage of producing an unbalance developing large kicks on the record, which kicks greatly exceed the random noise signal on the record. Those AVC systems employing grid control cause slight variations in the floating potential of the grid which, due to the high gain of the succeeding stages, has the effect of severe unbalance.

Therefore, an object of the present invention is to provide a new and improved AVC circuit which is free from unbalances of the type described above. Another object of the present invention is to provide a new and improved AVC circuit for use in connection with a seismic amplifier system.

A further object of the present invention is to provide a new and improved seismic amplifier.

Briefly, the above and further objects are realized in accordance with the present invention by providing an AVC circuit which includes a negative feedback path between the input and output amplification stage, having therein an impedance which is varied in accordance with the amplitude of the output signal from the amplifiers so that as the output signal from the amplifier increases the value of the negative feedback signal also increases thereby to reduce the output signal from the amplifier. In accordance with a preferred embodiment of the present invention, this control impedance is a light sensitive cell and a controlled light source therefor is energized in response to the output signal from the amplifier to effect the changes in the cell impedance.

Further objects and advantages of the present invention will become apparent as the following description proceeds, and the features of novelty which characterize the invention will be pointed out with particularly in the claims annexed to and forming a part of this specification.

For a better understanding of the present invention reference may be had to the accompanying drawing in which the single FIGURE is a schematic circuit diagram, partially in block diagram form of a seismic amplifier including the AVC circuit of the present invention.

The circuit shown in the drawing includes controlled amplifier 1 have two stages 2 and 3 employing negative feedback via a variable impedance feedback circuit 4. The impedance of the feedback circuit is controlled in accordance with the amplitude of signals applied from a source 10 which, as was indicated previously, includes the signals arriving at one of the geophones in the detector array. To effect the desired control, the feedback circuit includes a light sensitive cell 5 of the photoconductive type which does not generate a signal and which is not polarity sensitive. This cell is illustrated as being a photoelectric cell the impedance of which is inversely proportional to the amount of light reaching the cell from a controlled light source 6. The intensity of the light source 6 is varied by the signals from the amplifying stage 3 which are passed through a phase splitting stage 7 and a full wave rectifier 8 to develop D.C. signals for controlling a current amplifier 9. If the amplitude of the signals from the source 10 tends to increase, the current amplifier 9 supplies more current to the light source 6 thereby increasing the amount of the light reaching the cell 5. The impedance of the latter cell thus decreases to increase the negative feedback from the amplifying stage 3 to the stage 2, thereby decreasing the gain of the latter stage of an amount corresponding to the amplitude of the input signal. In similar manner, a decrease in the amplitude of signals from the source 10 results in decreased current from the amplifier 9 to the light source 6 thus decreasing the amount of light reaching the cell 5. The impedance of the cell 5 increases to decrease the negative feedback between the amplifying stages, thereby increasing the gain for the low amplitude signals.

Considering the details of the system shown in the drawing, the source of input signals 10 supplies electrical signals between the control grid 11 of a triode 12 in the amplifying stage 2 and a common conductor 13. A cathode resistor 14 connects the cathode 15 of the triode 12 to the common conductor 13 and the anode 16 of the triode 12 is connected to a suitable source of B+ voltage (not shown) through a suitable plate load resistor 17. A suitable low frequency bypass capacitor 18 is connected between the source of B+ energization voltage and ground. The amplified and inverted signal from the source 10 thus appears at the anode 16 and is coupled to the grid 23 of a triode 24 in the amplifying stage 3 via a coupling capacitor 21 and a grid resistor 22 connected between the grid 23 and the common conductor 13. The cathode 25 of the triode 24 is connected to the common conductor 13 through a suitable cathode resistor 26 and the anode 27 of the triode 24 is connected through a plate load resistor 28 to the source of B+ energization voltage. The signal which is thus supplied from the triode 12 to the input of the triode 24 is again amplified and inverted to provide between the anode 27 and the common conductor 13 a voltage signal which is of the same polarity as the output signals from the source 10 but which has been substantially amplified. The amplified signal from the stage 3 is then coupled to a set of input terminals 33 and 34 of the succeeding amplifying stages included in the block 35, this coupling being effected by means of a capacitor 31 and a resistor 32. The circuit in the block 35 also includes a power supply from which the B+ energization voltage for the tubes 12 and 24 may be conveniently supplied from terminals 36 and 37. The B+ voltage supplied from terminal 36 may differ from that supplied from terminal 37 due to the characteristics of the tubes employed although, obviously, these terminals may supply equal voltages if the tube characteristics permit.

In order to supply the output signal of the amplifying stage 3 to the input of the phase splitter 7, the anode 27 of the triode 24 is coupled via a capacitor 45 and a network of resistors 38, 39, 40 and 41 between the control grid 42 and the cathode 43 of a triode 44 in the phase splitter. The anode 46 of the triode 44 is connected through a plate load resistor 47 to the B+ terminal 36 of the power supply. The A.C. signals from the phase splitter 7 are supplied to the full wave rectifier 8 which develops corresponding D.C. control signals. More specifically, the full wave rectifier, which comprises the usual pairs of diodes connected back to back, has its input terminals 48 and 49 coupled to the amplifier through coupling capacitors 50 and 51. The capacitor 50 is connected between the terminal 48 and the junction 38a between resistors 38, 39 and 40 with the result that it supplies to the junction 48 an A.C. signal developed by the drop across resistor 38 resulting from space current flow of the triode 44. The capacitor 51, on the other hand, is connected between the junction 49 and the anode 46 of the triode. The full wave rectifier is excited by A.C. signals exactly 180° out of phase. Thus, an increase in the level of the A.C. signal from the amplifying stage causes the current flow through the triode 44 to increase, thereby driving the anode 46 in a negative direction and, at the same time, driving the junction 38a more positive due to the increased voltage drop across the resistor 38. The amplitude of the A.C. signal appearing between terminals 48 and 49 is, of course, directly proportional to the amplitude of the output signal of the amplifying stage 3. The A.C. signal across the terminals 48 and 49 is, of course, rectified by the full wave rectifier 8 to develop a D.C. control signal across the output terminals 52 and 53. This D.C. control signal, which has an amplitude directly proportional to the output of the amplifying stage 3, is developed across resistor 54 and is applied through resistor 66 between the base 55 and the emitter 56 of a transistor 57 in the current amplifier 9. The latter amplifier is of the two stage type with the second stage being energized by the signal developed across the resistor 66 which, as shown, is connected between the emitter 56 and the terminal 52. The second stage of the amplifier 9 includes a transistor 58 having its base 59 connected directly to the emitter 56 and having its collector 60 connected directly to the collector 61 of the transistor 57. The emitter 62 of the transistor 58 is connected to the output terminal 52 of the full wave rectifier so that the signal developed across the resistor 66 is applied between the base 59 and the emitter 62. The emitter 62 is also connected to the positive terminal 63 of a suitable source of D.C. power. The latter source serves to supply a standby current to the light source 6 and, to this end, its terminals 63 and 64 are connected to supply power to a circuit including a fixed, current limiting resistor 65, the light source 6 and a variable resistor 68 connected across the output of the current amplifier 9 between the emitter 62 and the collector 60 of the transistor 58. The resistor 68 is adjusted so that in the absence of signals from the current amplifier 9 the standby current flow through the source 6 is just below the level required to illuminate the lamp. The signal applied from the source 10 through the amplifying stages 2 and 3, through the phase splitter 7 and through the full wave rectifier 8 energizes the current amplifier 9 so that the latter begins to supply current through its collectors 60 and 61 as soon as the level of the input signal exceeds a predetermined level and becomes sufficient to activate the amplifier 9. This current flow illuminates the light source 6. The light from the source 6 may be passed through focusing lenses or the like (not shown) to the light cell 5 to control the impedance of the latter. The light cell 5 forms part of the negative feedback network 4 which also includes a coupling capacitor 67 and which is connected between the anode 27 of the amplifying stage 3 and the cathode 15 of the amplifying stage 2 Thus, the network 4 supplies a signal to the cathode 14 which is in phase with the signal applied to the control grid 11 from the source 10. The amplitude of the feedback signal is, of course, a function of the impedance of the cell 5.

To understand the operation of the circuit shown in the drawing, the operation will first be considered when an increased amplitude signal is applied to the control grid 11 from the source 10. This signal is amplified by the stages 2 and 3. The full wave rectifier 8 develops a D.C. control signal which causes the current amplifier to conduct, thereby increasing the illumination of the light source 6 and decreasing the impedance of the cell 5. The feedback network 4 thus supplies a larger feedback signal to the cathode circuit of the amplifying stage and, as a result, the gain of the latter stage is reduced. Similarly, when the amplitude of the input signal decreases, the current amplifier 9 supplies less current and the light intensity decreases. This causes the impedance of the cell to increase thereby reducing the negative feedback via the circuit 4 and increasing the gain of the amplifying stage 2.

In order to provide further control over the gain of the amplifier 1, an A.C. suppression voltage of a relatively high frequency may be applied from terminals 70 and 71 to the grid circuit of the phase splitter 7. This suppression voltage is adapted to decrease the gain of the amplifier during the early portion of the record following the time break when very high amplitude signals are arriving at the geophone. The gain is then increased for those portions of the record when the reflection signals are arriving at the geophone. To this end, the suppression voltage takes the form of an exponentially varying A.C. signal of the type shown in the drawing. This signal may be derived from the charge or discharge of a capacitor connected in a suitable voltage generating network. The suppression voltage is developed across a potentiometer 72 and is applied via a coupling capacitor 73 to the control grid 42 of the triode 44. During the early or high voltage portion of the period, the suppression voltage causes the current amplifier 9 to conduct, thus increasing the intensity of the light from the source 6 and maintaining the gain of the amplifier 1 relatively low in the manner described above. As the suppression voltage decays the current amplifier 9 conducts less and less so that the gain of the amplifier 1 gradually increases. This control, of course, supplements that derived from the signals supplied to the phase splitter 7 from the amplifying stage 3.

A portion of the suppression voltage may also be supplied from the potentiometer 72 through a coupling capacitor 74 to the gain control circuit of the amplifying stages included in the block 35, thus controlling the gains of these stages as a function of time in the manner indicated above.

The AVC arrangement described above is entirely free from unbalance problems of the type described since it does not rely upon changing grid bias or varying the bypass of the input signal. Since the current amplifier has practically no time constant, the time constant of the feedback circuit including the phase splitter 7, the rectifier 8, the current amplifier 9 and the light source 6, is determined almost exclusively by the time required to vary the intensity of the light source and by the response time of the light sensitive cell 5. This time constant is not exponential in nature but is actually akin to a time delay, thus reducing the undesired exponential effects of prior AVC circuits which offer some attenuation to signals immediately succeeding those to be controlled or reduced in amplitude.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In an amplifier for use with a detector of seismic waves having a high amplitude during an initial period followed by a subsequent period of somewhat lower amplitude, said amplifier comprising a plurality of stages of amplification, a feedback circuit having an input connected to one of said stages and an output connected to another of said stages for supplying a feedback signal to affect the gain of said another stage, said feedback circuit including a variable impedance for controlling the magnitude of said feedback signal, means for automatically varying said impedance in accordance with the amplitude of the output signal from said one stage, thereby to control automatically the gain of said another stage, means for developing a suppression signal having a first level during the initial period of said seismic waves and varying to a second and different level during the subsequent period, and means connected to said developing means and to said impedance varying means for supplying said suppression signal to said impedance varying means in order to vary the variable impedance in such manner that the gain of the amplifier is relatively low during said initial period and is somewhat higher during the subsequent period.

2. The amplifier defined by claim 1 wherein said variable impedance is a light sensitive cell and the means for varying said impedance includes a light source supplying light to said cell and having an intensity which varies in accordance with the amplitude of the output signal from said one stage.

3. The amplifier defined by claim 2 wherein the light source varies in accordance with changes in a D.C. control which is developed by means including a rectifier connected to the output of said one stage.

4. In an amplifier for use with a detector of seismic waves having a high amplitude during an initial period followed by a subsequent period of somewhat lower amplitude, said amplifier comprising a plurality of stages of amplification, a first feedback circuit having an input connected to one of said stages and an output connected to another of said stages for supplying a feedback signal to affect the gain of said another stage, said first feedback circuit including a variable impedance for controlling the magnitude of said feedback signal, a second feedback circuit connected to one of said amplifier stages subsequent to said another stage and including an amplifying means, means connected to the output of said amplifying means for automatically varying said impedance in accordance with the amplitude of the output signal from the amplifying means, thereby to control automatically the gain of said another stage, means for developing a suppression signal having a first level during the initial period of said seismic waves and varying to a second and different level during the subsequent period, and means connecting said amplifying means to the developing means to supply said suppression signal to said amplifying means in order to vary the variable impedance in such manner that the gain of the amplifier is relatively low during said initial period and is somewhat higher during the subsequent period.

5. The amplifier defined by claim 4 wherein the first feedback circuit is effective to supply a degenerative feedback signal to said another stage.

6. The amplifier defined by claim 4 wherein said variable impedance is a light sensitive cell and the means for varying said impedance includes a light source supplying light to said cell and having an intensity which varies in accordance with the amplitude of the signal from said amplifying means.

7. The amplifier defined by claim 6 wherein the light source varies in accordance with changes in a D.C. control signal which is developed by means including a rectifier connected to the output of said amplifying means.

8. The amplifier defined by claim 6 wherein the first feedback circuit is effective to supply a degenerative feedback signal to said another stage.

References Cited in the file of this patent

UNITED STATES PATENTS

| | | |
|---|---|---|
| 1,678,077 | Powell | July 24, 1928 |
| 1,843,288 | Leonard | Feb. 2, 1932 |
| 2,242,638 | Balsley | May 20, 1941 |
| 2,280,293 | Kreer | Apr. 21, 1942 |
| 2,307,308 | Sorensen | Jan. 5, 1943 |
| 2,428,039 | Royden | Sept. 30, 1947 |